(12) United States Patent
Ma

(10) Patent No.: US 9,362,858 B2
(45) Date of Patent: Jun. 7, 2016

(54) SYSTEM AND METHOD FOR OPERATING A TURBINE FARM

(75) Inventor: Xiaoqin Ma, Nottingham (GB)

(73) Assignee: Romax Technology Limited, Nottingham (GB)

( * ) Notice: Subject to any disclaimer, the term of this patent is extended or adjusted under 35 U.S.C. 154(b) by 728 days.

(21) Appl. No.: 13/495,244

(22) Filed: Jun. 13, 2012

(65) Prior Publication Data

US 2013/0103213 A1     Apr. 25, 2013

(30) Foreign Application Priority Data

Jun. 13, 2011   (GB) .................................. 1109897.7

(51) Int. Cl.
| | |
|---|---|
| *H02P 8/00* | (2006.01) |
| *F03D 7/04* | (2006.01) |
| *F03D 11/00* | (2006.01) |
| *G05B 23/02* | (2006.01) |

(52) U.S. Cl.
CPC ..... *H02P 8/00* (2013.01); *F03D 7/047* (2013.01); *F03D 7/048* (2013.01); *F03D 11/0091* (2013.01); *G05B 23/0272* (2013.01); *F05B 2240/96* (2013.01); *F05B 2260/80* (2013.01); *Y02E 10/722* (2013.01); *Y02E 10/723* (2013.01)

(58) Field of Classification Search
CPC ....... H02P 8/00; Y02E 10/723; Y02E 10/722; F05B 2240/96; F03D 7/047; F03D 7/048
USPC .................. 700/17, 83, 286, 287; 290/44
See application file for complete search history.

(56) References Cited

U.S. PATENT DOCUMENTS

| | | | | |
|---|---|---|---|---|
| 8,761,948 | B1 * | 6/2014 | Ippolito et al. ............... | 700/286 |
| 2004/0230377 | A1 * | 11/2004 | Ghosh et al. ..................... | 702/3 |
| 2007/0109301 | A1 * | 5/2007 | Smith ............................ | 345/440 |
| 2010/0212653 | A1 * | 8/2010 | McDonald .................... | 126/573 |

\* cited by examiner

*Primary Examiner* — Mohammad Ali
*Assistant Examiner* — Nathan L Laughlin

(57) ABSTRACT

A system for operating a wind or water turbine farm comprising a plurality of turbines comprising: a computing device; means for providing operational data relating to the plurality of turbines to the computing device; a computer-readable medium coupled to the computing device and having instructions stored thereon which, when executed by the computing device, causes the computing device to: arrange the operational data for each turbine into an array comprising operational data and having a first dimension corresponding to the plurality of turbines; generate a graphical user interface; generate within the graphical user interface a graphical representation of the array.

11 Claims, 5 Drawing Sheets

Turbine 68

Turbine 68

SYSTEM AND METHOD FOR OPERATING A TURBINE FARM

CROSS-REFERENCE TO RELATED APPLICATIONS

This application claims the benefit of U.K. Patent Application No. GB 1109897.7, filed Jun. 13, 2011.

BACKGROUND OF THE INVENTION

The present invention is related for systems for operating wind or water turbine farms, and in particular for operating a wind turbine farm.

Conditioning monitoring systems for wind turbine installations comprising multiple wind turbines collect relatively large amounts of data, including historical, SCADA, and real-time data.

It is difficult for the wind farm operator to extract and visualize key information contained in this data. The key information the wind farm operator needs is to do with the health of turbines and their components, and/or damage caused to turbines and their components.

For example, vibration analysis generally relies on a measurement provided by a sensor exceeding a predetermined threshold, which is prone to false alarms if the threshold is set too low. The threshold level is not necessarily constant and may vary with frequency (and hence speed). The presence of shocks and extraneous vibrations means that the threshold level must be set sufficiently high to minimize the risk of false-alarms. Furthermore, the threshold must be sufficiently high to avoid any negative effects caused by 'creep' in sensor performance which may occur over its lifetime. In addition, there is no discrimination between vibrations associated with failure or damage and those which are not indicative of failure or damage.

BRIEF SUMMARY OF THE INVENTION

According to one aspect of the present invention there is provided a system for operating a wind or water turbine farm comprising a plurality of turbines comprising: a computing device; means for providing operational data relating to the plurality of turbines to the computing device; a computer-readable medium coupled to the computing device and having instructions stored thereon which, when executed by the computing device, causes the computing device to: arrange the operational data for each turbine into an array comprising operational data and having a first dimension corresponding to the plurality of turbines; generate a graphical user interface; generate within the graphical user interface a graphical representation of the array.

Preferably, the operational data is normalized.

Preferably, the operational data is normalized against a mean value for the operational data across the wind or water turbine farm.

Preferably, the operational parameter is a power output from each wind turbine during a time period is normalized by dividing it by a notional maximum expected power output over the period of time.

Preferably, the graphical representation is a rectangular array of panels, one axis of the rectangle corresponding to the first dimension of the array, another axis to the second dimension of the array, and a visual indicator for each panel corresponding to a value of each element of the array.

Preferably, a second dimension of the array is a time series.

Preferably, elements of the array comprise operational data for a particular wind turbine at a particular time.

Preferably, a value for an operating parameter at a particular point in time is processed to give a value, for each turbine, for how long the turbine has been operating at a particular operating parameter value.

Preferably, the system additionally comprising the step of assigning a visual display indicator to each wind turbine.

Preferably, a total duration at each operating temperature is given by the width of the panel.

Preferably, the graphical representation is a radar plot, in which each sector corresponds to a value for an operating parameter.

Preferably, the graphical representation is a polar plot, in which each axis corresponds to a value for an operating parameter for individual components of the one or more wind turbines.

Preferably, the operating parameter is an orientation of the wind turbine, and the graphical representation shows the amount of time each wind turbine has been pointing in a certain direction.

Preferably, the graphical representation shows the amount of time each wind turbine has been pointing in a certain direction is compared with a wind rose generated to identify misalignment of the wind turbine orientation against the prevailing wind direction.

Preferably, the graphical representation comprises a plurality of graphical representations for a corresponding plurality of turbines in the farm, and in which each graphical representation includes multiple parameters to allow the user to make a side-by-side comparison to be made.

Preferably, the parameters include operational parameters, data, or parameters collected or calculated from sensors or calculated values.

Preferably, the computer-readable medium coupled to the computing device and having instructions stored thereon which, when executed by the computing device, causes the computing device to: analyze the arrays to generate one or more alarms.

Preferably, the instructions are for pattern recognition, machine learning or artificial intelligence algorithms.

Preferably, the means for providing operational data comprises one or more condition monitoring systems.

Preferably, a user identifies variations from the norm of particular wind turbines from the graphical representation.

Preferably, the instructions, when executed by the computing device, additionally cause the computing device to: display a graphical representation of a layout of the turbine farm, in which the layout includes one or more icons corresponding to one or more turbines, the icons being selectable by a user; determine which turbine a user has been selected; generate within the graphical user interface a graphical representation of the operation of the selected turbine.

Preferably, turbines can be selected from a row to allow the user to identify a wake effect.

Preferably, turbines can be selected as a string to allow the user to identify potential issues with one particular string of turbines.

Also disclosed is a method for operating a wind turbine farm comprising a plurality of wind turbines, the method comprising the steps of: providing an array of operational data for the plurality of wind turbines; displaying the array as an array of panels, the panels corresponding to the operational data.

Preferably, the step of providing the data comprises collecting data from condition monitoring systems installed at the wind farm.

Preferably, the first dimension of the array corresponds to each of the plurality of wind turbines, a second dimension of the array is a time series, Preferably, elements of the array comprise operational data for a particular wind turbine at a particular time.

Preferably, the method additionally comprises the step of normalizing the operational data.

Preferably, the method additionally comprises the step of assigning a visual display indicator to the normalized operational data.

Preferably, a third dimension of the array comprises values for the operating parameter, and the elements of the array are the cumulative time each wind turbine has spent at a particular operating parameter.

Preferably, the method additionally comprises the step of assigning a visual display indicator to each wind turbine.

Preferably, a total duration at each operating temperature is given by the width of the panel.

Preferably, operating wind farms includes the additional step of a wind farm operator identifying variations from the norm of particular wind turbines.

DETAILED DESCRIPTION OF THE INVENTION

Table 1 shows an array of data from a wind farm. The wind farm comprises n wind turbines (WT), identified in a first dimension of the array as $WT_1$ to $WT_n$. A second dimension of the array is a time series from $t_1$ to $t_n$. The time series can be denominated in a variety of ways: for example it can be a sequence of dates, or it can be denominated in seconds or hours. The elements of the array comprise operational data for a particular wind turbine at a particular time.

For example, the operational data can be power output for the wind turbines for each day of the week over a period of several months.

TABLE 1

Operating Parameters from a wind turbine farm

| Wind turbine | $t_1$ | $t_2$ | $t_3$ | $t_n$ |
|---|---|---|---|---|
| $WT_1$ | OP $WT_1 t_1$ | OP $WT_1 t_2$ | OP $WT_1 t_3$ | OP $WT_1 t_n$ |
| $WT_2$ | OP $WT_2 t_1$ | OP $WT_2 t_2$ | OP $WT_2 t_3$ | OP $WT_2 t_n$ |
| $WT_3$ | OP $WT_3 t_1$ | OP $WT_3 t_2$ | OP $WT_3 t_3$ | OP $WT_3 t_n$ |
| $WT_n$ | OP $WT_n t_1$ | OP $WT_n t_2$ | OP $WT_n t_3$ | OP $WT_n t_n$ |

Table 1 shows a two dimensional array, for example, power output for the wind turbines for each day of the week over a period of several months. The invention is not limited to two dimensional arrays: the array can comprise three or more dimensions. For example, for the same wind turbines and time series, the operational data may be any operating parameter provided by a condition monitoring system, such as operating temperature, power output, vibration and the like.

If the data shown in Table 1 is displayed for many wind turbines over many days of operation, the numerical data does not easily yield visual trends that can readily identified by the wind turbine operator. This can be addressed at least partly by normalising the data against another factor.

For example the power output from each wind turbine during a time period (which may be an hour, a day, a week, and so on) can be transformed into a Capacity Factor by dividing it by a notional maximum expected power output over the period of time. For example, 60% of the maximum power output may be chosen. This gives a range of values for the Capacity Factor of between 0 and 60%. This gives an array of data in which the data is normalized, but this normalized data does not easily yield visual trends that can readily identified by the wind turbine operator.

Figure 1A:
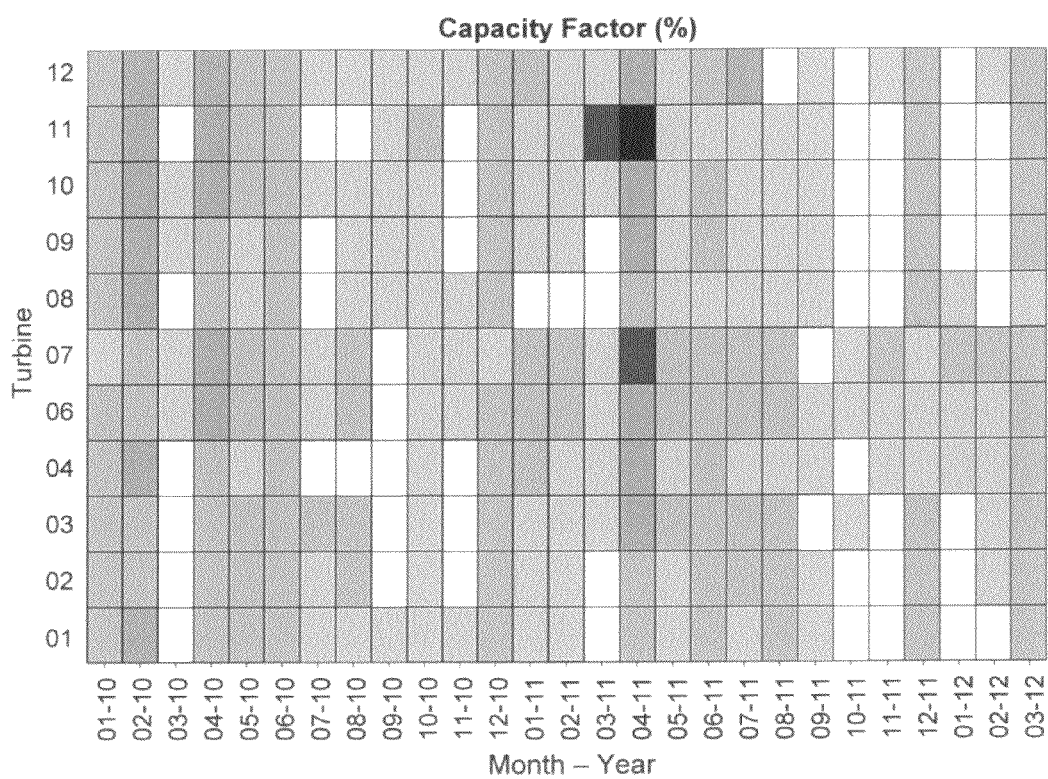
FIGS. 1 and 2 show displays produced according to the present invention.
Figure 1B:
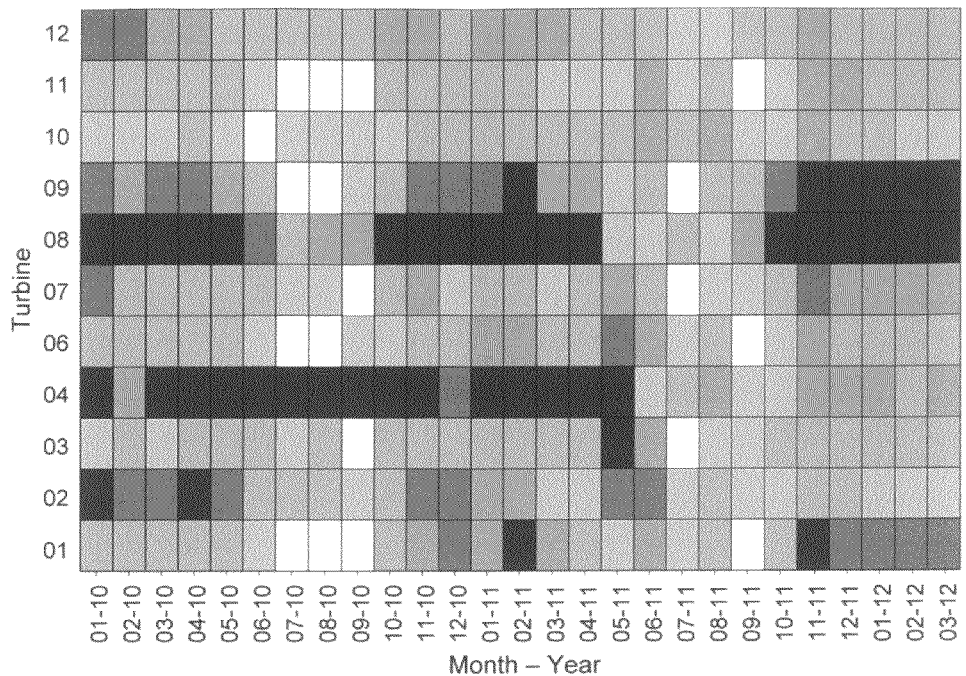

The normalized data is given a visual indicator, for example a grey scale or color scale shade. For example, a low capacity factor can be given a dark shade and a high capacity factor can be given a light shade. Alternatively or additionally, where the shade is a color shade, a low capacity factor could be shown as a dark red, and a high capacity factor could be shown as a light green. When this normalized, shaded data is displayed as an array of shaded panels, the wind farm operator can quickly see patterns and trends which assist in the operation of the wind farm by giving an indication of under-performing turbines, as shown in FIG. 1A. A similar approach is shown in FIG. 1B, where power deviation generates a similar map. This type of map helps the operator to identify any problem with the fleet.

The shaded normalized data is displayed on a display screen forming a graphical user interface, or it is displayed as a panel as part of a graphical user interface. The interface can include scroll bars so that the time series can be scrolled to look at a particular period of time.

The interface can include the underlying data so that when a pointer, e.g. a mouse pointer, is moved over a particular panel, the raw data for that wind turbine at that time can be shown as a pop-up or mouse-over.

In addition, the user is able to select which set of data to show by, for example, a drop down list of available data.

This approach means that the fleet of wind turbines acts as a 'control' or 'norm' value, and variations from this 'control' or 'norm' may indicate that a particular turbine is in need of maintenance.

Also disclosed is an approach for manipulating an array such as that shown in Table 1. This array gives, for each turbine, a value for an operating parameter at a particular point in time. The data is processed to give a value, for each turbine, for how long the turbine has been operating at a particular operating parameter value. Now the array has one of the dimensions of the array comprising n wind turbines (WT), identified as $WT_1$ to $WT_n$, as before, but the second dimension is the operating parameter. Now each element is the cumulative amount of time each wind turbine has spent at a particular operating parameter.

Figure 2:
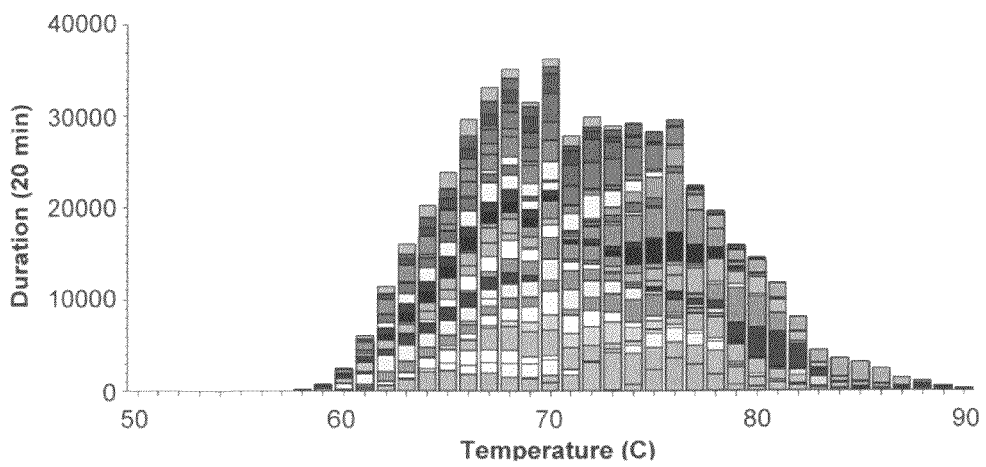

This data can be presented in a histogram-like format, where each wind turbine is assigned a visual display value as above. For each wind turbine, total duration at each operating temperature is given by the width of a panel, and the panels for successive wind turbines are added to the previous panels, to give a histogram-like display. This is illustrated in FIG. 2 where the operating parameter is temperature.

Figure 3:
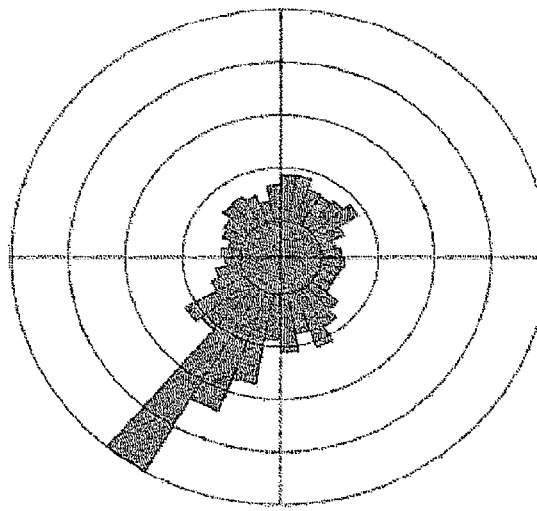
FIG. 3 shows a graphical representation in the form of a polar plot, in which the operating parameter is the orientation of the wind turbine.

The data can also be represented in a polar plot, as shown in FIG. 3. Here the operating parameter is the orientation of the wind turbine, and the drawing shows the amount of time each wind turbine has been pointing in a certain direction. This can be compared with a wind rose generated from a meteorological mast or other wind profile measurement equipment, and provides a useful approach for identifying misalignment of the wind turbine orientation against the prevailing wind direction. The wind data is filtered at 80% power to avoid the data when the turbine is not generating power.

Figure 4:
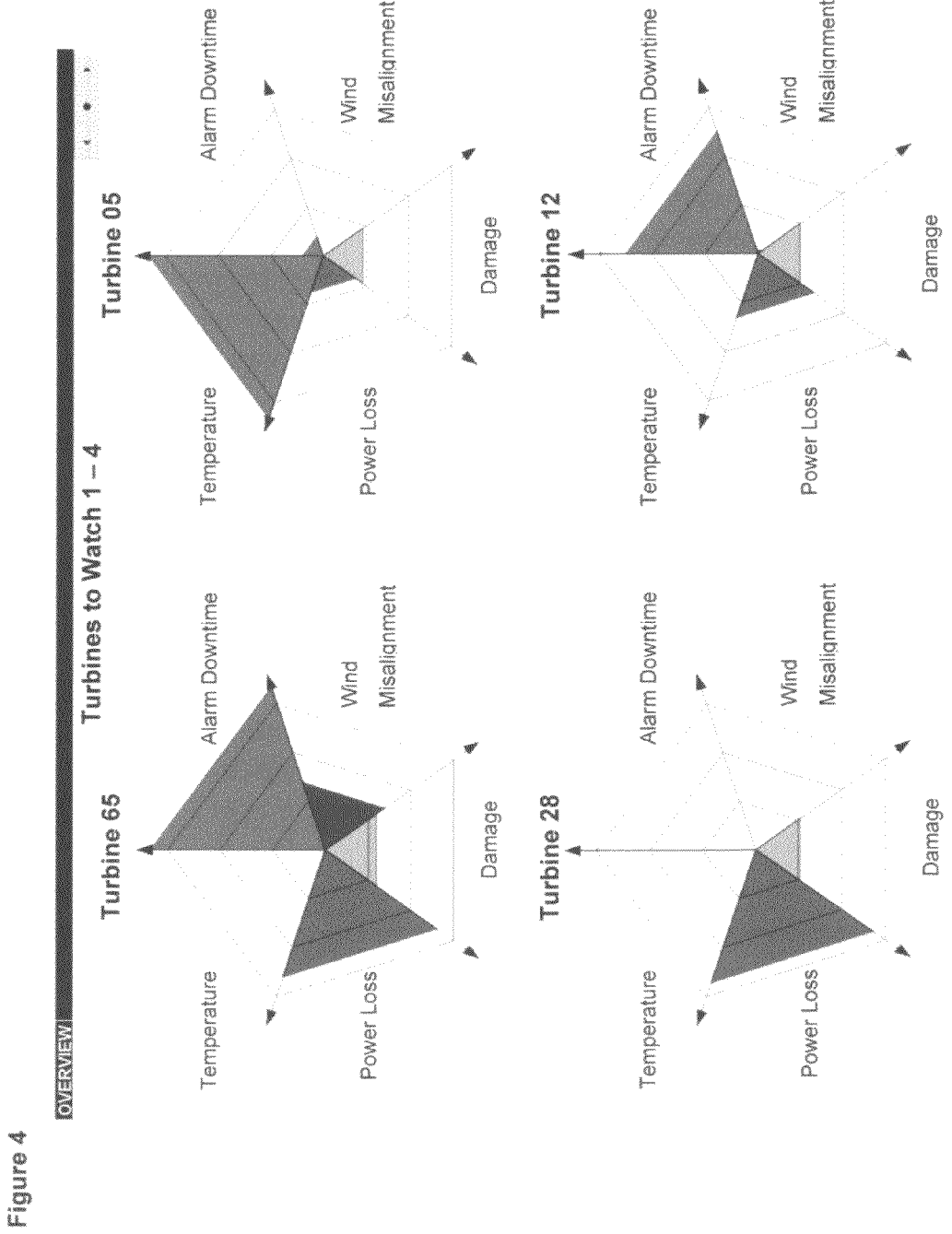
FIG. 4 shows a graphical representation where multiple arrays are combined and displayed.

Also disclosed are approaches where data from multiple arrays are combined and displayed. Thus for each turbine, the time series data can be manipulated to give average values, peak values, cumulative times etc during a particular operating window. This combined data can be displayed for particular selected turbines. Thus in FIG. 4, values for alarm downtime, wind misalignment, damage, power loss and temperature are shown for four turbines, which allows a side-by-side comparison to be made. This overview panel provides a summary of the wind turbine performance and health status by fusing different parameters in one diagram. This will allow the users to quickly identify the turbine with potential issues. The parameters can include operational parameters, data or parameters collected or calculated from sensors or calculated value from the parameters mentioned above.

Figure 5:
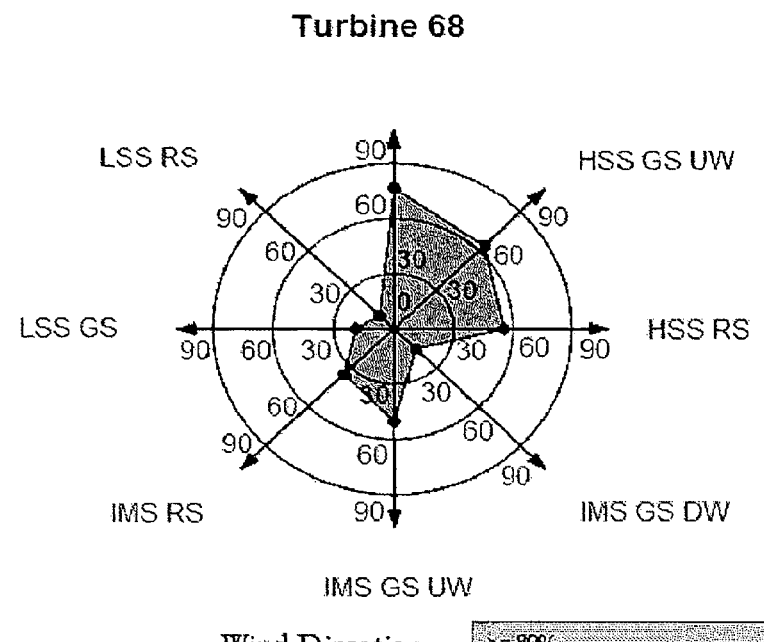
FIG. 5 shows a graphical representation in the form of a polar plot.

Data from individual components can also be investigated. In FIG. 5, damage to particular turbine gearbox components is shown in a polar plot. This is a way to display the life parameters (Damage, etc) or Health Indicator of each individual component, subcomponent or sub-assembly system of wind turbines. This graph will help the user to identify the weakest part in the turbine at any time.

Figure 6:
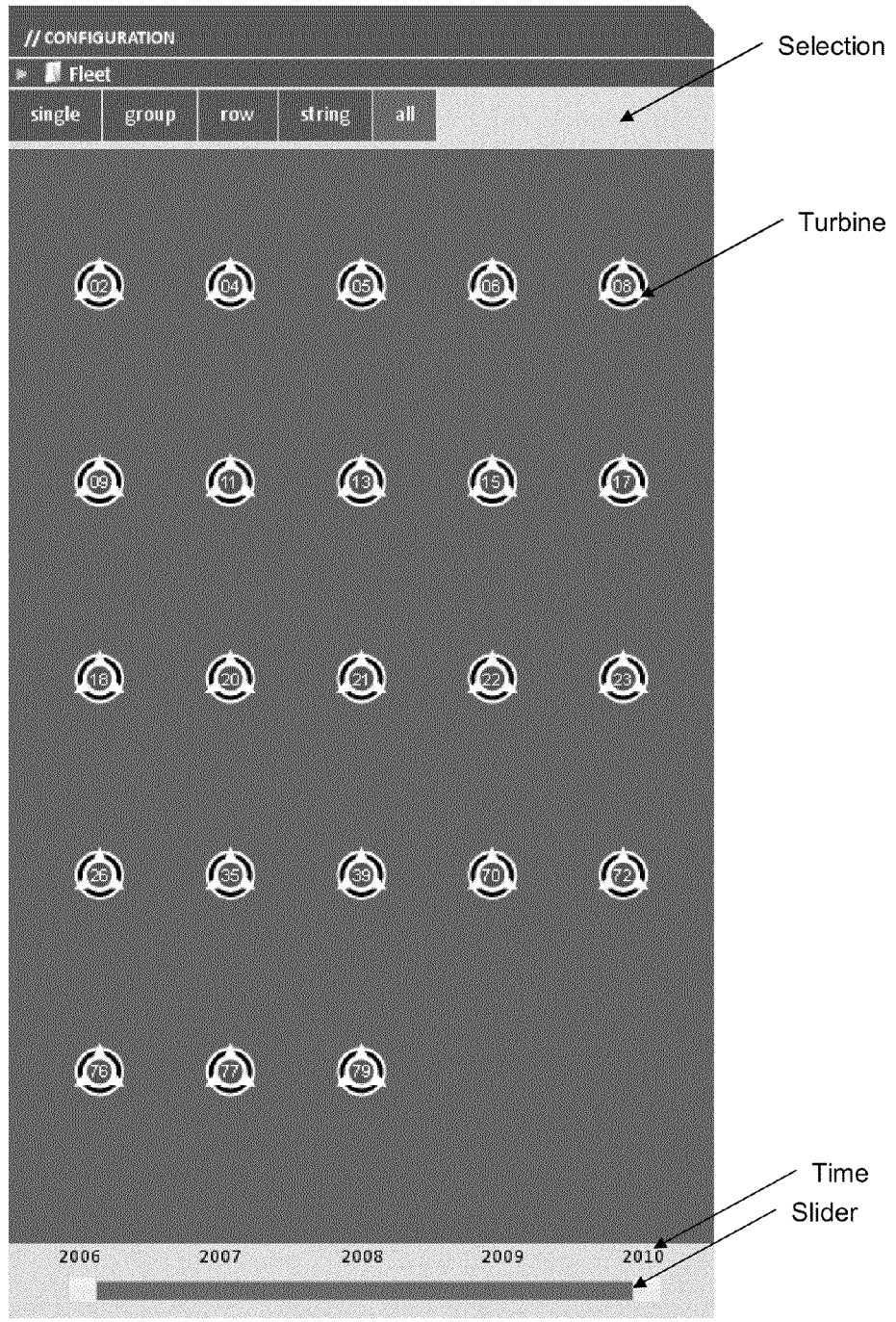
FIG. 6 shows a graphical representation of a map of turbines for the farm.

Individual turbines can be selected from an overview graphical interface, which is shown and described in FIG. 6.

The navigation panel is developed specifically for wind. It has the selection of row to allow the user to identify the wake effect and it has the string option to allow the user to identify potential issues with one particular string of turbines (same cable connection or same substation).

Wind turbines extract energy from the wind and there is a wake from the wind turbine downstream where wind speed is reduced. The wake effect causes the changes in wind speed by the impact of the turbines on each other. The power production will be affected by the wake effect as well as the reliability of the turbines due to the turbulence generated from the wake effect.

Pattern recognition, machine learning or artificial intelligence algorithms can be used to generate the alarms or/and provide diagnostics and prognostics information or health assessment of the fleet, farm, turbine, sub-assembly system, component and sub-component based on the data, information or/and patterns displayed from the graphs. One example could be that using the pattern recognition algorithm to classify between a healthy temperature pattern as shown in FIG. 2, and an unhealthy temperature pattern. It should be able to generate a warning or an alarm when a different pattern is detected. The same principle applies to the overview shown in FIG. 4, the power production/deviation and other parameters, i.e. operational parameters, data or parameters collected or calculated from sensors or calculated value from the parameters mentioned above.

The algorithm to be used for the pattern recognition can be classification algorithms, regression algorithms, neural network, fuzzy logic, neural fuzzy logic, genetic algorithm, Bayesian network, etc. It is the type of algorithm that can distinguish the difference between various different patterns or deviation from one particular pattern with or without supervision.

The system for operating a wind or water turbine farm comprising a plurality of turbines includes a computing device, and a computer-readable medium coupled to the computing device having instructions controlling the operation of the computer. The system also includes means for providing operational data relating to the plurality of turbines. The instructions cause the computing device to arrange the operational data for each turbine into an array comprising operational data. The array has a first dimension corresponding to the plurality of turbines. The computer generates a graphical user interface and generates within the graphical user interface a graphical representation of the array.

The computer can be a server, located remotely from the collecting data from one or more wind farms and displaying the graphical representation in a control room, or it can be local to a single wind or water turbine farm.

The invention claimed is:

1. A system for operating a wind or water turbine farm comprising a plurality of turbines comprising:
   a computing device;
   means for providing operational data relating to the plurality of turbines over a period of time to the computing device;
   a computer-readable medium coupled to the computing device and having instructions stored thereon which, when executed by the computing device, causes the computing device to:
   arrange the operational data for each turbine into an array comprising a time series relating to the period of time, operational data relating to the plurality of turbines, and having a first dimension corresponding to the plurality of turbines;
   in which a value for an operating parameter at a particular point in time is processed to give a value, for each turbine, for how long the turbine has been operating at a particular operating parameter value, in which a cumulative amount of time each wind turbine has spent at the particular operating parameter is given by the width of the panel, and a further array is formed comprising the first dimension of the array, a second dimension corresponds to the values of the operating parameter and each element of the further array is the cumulative amount of time each wind turbine has spent at the particular operating parameter,
   generate a graphical user interface;
   generate within the graphical user interface a graphical representation of the array in which the graphical representation is a rectangular array of panels, one axis of the rectangle corresponding to the second dimension of the further array, another axis to the elements of the further array, the member of the graphical representation of the further array is the panel, and a visual indicator for each panel corresponding to values of the first dimension of the further array;
   assign a visual indicator to a member of the graphical representation of the array;
   whereby the graphical representation identifies to an operator of the wind or water turbine farm variations from the norm of particular wind turbines requiring maintenance.

2. The system according to claim 1, in which the operating parameter is operating temperature.

3. The system according to claim 1, in which the graphical representation comprises a plurality of graphical representations for a corresponding plurality of turbines in the farm, and in which each graphical representation includes multiple parameters to allow the user to make a side-by-side comparison to be made.

4. The system according to claim 3, in which the parameters include operational parameters, data, or parameters collected or calculated from sensors or calculated values.

5. The system according to claim 3, in which the computer-readable medium coupled to the computing device and having instructions stored thereon which, when executed by the computing device, causes the computing device to: analyze the arrays to generate one or more alarms.

6. The system according to claim 5, in which the instructions are for pattern recognition, machine learning or artificial intelligence algorithms.

7. The system according to claim 1, in which the instructions, when executed by the computing device, additionally cause the computing device to:
  display a graphical representation of a layout of the turbine farm, in which the layout includes one or more icons corresponding to one or more turbines, the icons being selectable by a user;
  determine which turbine a user has been selected;
  generate within the graphical user interface a graphical representation of the operation of the selected turbine.

8. The system according to claim 7, in which turbines can be selected from a row to allow the user to identify a wake effect.

9. The system according to claim 7, in which turbines can be selected as a string to allow the user to identify potential issues with one particular string of turbines.

10. A system for operating a wind or water turbine farm comprising a plurality of turbines comprising:
  a computing device;
  means for providing operational data relating to the plurality of turbines to the computing device;
  a computer-readable medium coupled to the computing device and having instructions stored thereon which, when executed by the computing device, causes the computing device to:
  arrange the operational data for each turbine into an array comprising operational data and having a first dimension corresponding to the plurality of turbines;
  generate a graphical user interface;
  generate within the graphical user interface a graphical representation of the array, in which the graphical representation is a polar plot, in which each axis corresponds to a value for an operating parameter for individual components of the one or more wind turbines, in which the operating parameter is an orientation of the wind turbine, and in which the graphical representation shows the amount of time each wind turbine has been pointing in a certain direction.

11. The system according to claim 10, in which the graphical representation showing the amount of time each wind turbine has been pointing in a certain direction is compared with a wind rose generated to identify misalignment of the wind turbine orientation against the prevailing wind direction.

\* \* \* \* \*